United States Patent
Saika

(10) Patent No.: US 7,181,583 B2
(45) Date of Patent: Feb. 20, 2007

(54) METHOD AND PROGRAM FOR CREATING A SNAPSHOT, AND STORAGE SYSTEM

(75) Inventor: Nobuyuki Saika, Yokosuka (JP)

(73) Assignee: Hitachi, Ltd., Tokyo (JP)

(*) Notice: Subject to any disclaimer, the term of this patent is extended or adjusted under 35 U.S.C. 154(b) by 316 days.

(21) Appl. No.: 10/979,186

(22) Filed: Nov. 3, 2004

(65) Prior Publication Data

US 2006/0047931 A1  Mar. 2, 2006

(30) Foreign Application Priority Data

Aug. 27, 2004  (JP) ............... 2004-248215

(51) Int. Cl.
*G06F 12/16* (2006.01)
(52) U.S. Cl. ................... 711/162; 711/204
(58) Field of Classification Search ............ 711/161, 711/162; 707/204
See application file for complete search history.

(56) References Cited

U.S. PATENT DOCUMENTS

2004/0250033 A1* 12/2004 Prahlad et al. ............ 711/162

2006/0047926 A1* 3/2006 Zheng ...................... 711/162

FOREIGN PATENT DOCUMENTS

JP  2002-278819  9/2002

* cited by examiner

*Primary Examiner*—Jack A. Lane
(74) *Attorney, Agent, or Firm*—Antonelli, Terry, Stout and Kraus, LLP.

(57) ABSTRACT

This invention includes: a step (S1) of receiving a snapshot creation request from a client computer; a step (S3) of obtaining, upon reception of the snapshot creation request, a usage ratio of a second volume by the update differences; a step (S2) of obtaining a use history of the update differences in the second volume of the user; a step (S4, S5) of choosing, based on the usage ratio and the use history, one from differential snapshot in which the update differences of the first volume are written in the second volume and volume snapshot in which a third volume is synchronized with the first volume; and a step (S6, S7) of executing the chosen one of differential snapshot and volume snapshot. As a result, it is possible to economically use a differential volume by using differential snapshot in combination with volume snapshot.

20 Claims, 10 Drawing Sheets

EXAMPLE OF INPUT INFORMATION:

SUBJECT/USER:
FILE SYSTEM NAME
ACCOUNT

JUDGMENT CONDITION 1
(SET BY ADMINISTRATOR)
- EMPLOY DIFFERENTIAL SNAPSHOT WHEN DIFFERENTIAL VOLUME USAGE RATIO < 30%
- SEE CONDITION 2 WHEN 30% ≤ DIFFERENTIAL VOLUME USAGE RATIO < 70%
- EMPLOY VOLUME SNAPSHOT WHEN DIFFERENTIAL VOLUME USAGE RATIO > 70%

JUDGMENT CONDITION 2
(SET BY ADMINISTRATOR)
- EMPLOY DIFFERENTIAL SNAPSHOT WHEN REMAINING DIFFERENTIAL SS NUMBER/DIFFERENTIAL SS REQUEST COUNT < 30%
- EMPLOY VOLUME SNAPSHOT WHEN REMAINING DIFFERENTIAL SS NUMBER/DIFFERENTIAL SS REQUEST COUNT > 30%

SNAPSHOT UTILIZATION STATUS

|     | acount1 | acount2 | acount3 | ... |
| --- | --- | --- | --- | --- |
| fs1 | 7/10 ...... | | | |
| fs2 | | 3/15 ...... | | |
| fs3 | | | 5/20 (REMAINING DIFFERENTIAL SS NUMBER/SS REQUEST COUNT) | |
| .. | | | | |

*FIG. 4*

EXAMPLE OF OUTPUT INFORMATION:

SNAPSHOT UTILIZATION STATUS
```
      acount1  acount2  acount3 ...
fs1   7/10     3/15     5/20 (REMAINING DIFFERENTIAL SS NUMBER/SS REQUEST COUNT)
fs2   ......   ......   ......
fs3   ...
```
611   612            612n

FIG. 6

| i | 1 | 2 | 3 | ...... | n-1 | n |
|---|---|---|---|---|---|---|
| ACCOUNT | ... | ... | ... | ... | user001 | ... |
| FILE SYSTEM NAME | ... | ... | ... | ... | fs1 | ... |
| REMAINING SS NUMBER | ... | ... | ... | ... | 5 | ... |
| SS CREATION REQUEST COUNT | ... | ... | ... | ... | 10 | ... |

METHOD AND PROGRAM FOR CREATING A SNAPSHOT, AND STORAGE SYSTEM

CLAIM OF PRIORITY

The present application claims priority from Japanese application P2004-248215 filed on Aug., 27, 2004, the content of which is hereby incorporated by reference into this application.

BACKGROUND

This invention relates to a data backup method. More specifically, this invention relates to a data backup method that uses differential snapshots.

Snapshot, which is a known method to preserve original data while maintaining consistency of the data at one point in time, is employed in computer systems for backup of data stored in storage systems and for other uses.

One type of snapshot is volume snapshot, in which a snapshot is taken by creating a copy of a primary volume which stores original data in a separate differential volume.

Another type of snapshot is differential snapshot, in which the consistency between a primary volume which stores original data and a secondary volume which stores copy data at one point in time is maintained throughout the subsequent updates to the original data to keep the original data available for reference after the updates.

According to the technique of differential snapshot, data at a time point whose consistency is to be kept intact is stored in a separate differential volume in the case where a later update to the original data is planned. In other words, with an update to the original data expected, data at a time point whose consistency is to be kept intact is stored in a separate storage volume whereas the original data is not copied without an update expected (see JP 2002-278819, for example).

SUMMARY

Volume copying (volume snapshot) described above needs as many secondary volumes as the number of snapshots to be taken, and accordingly could increase the storage system in size.

Differential snapshot described above needs smaller storage volume capacity than volume copying but, when differential snapshots created are left undeleted, the differential volume could overflow with differential information causing loss of earlier differential information stored.

This invention has been made in view of the above problems, and it is therefore an object of this invention to economically use a differential volume by monitoring how much of the differential volume is used and the differential snapshot utilization status and by using differential snapshot in combination with volume snapshot.

An embodiment of this invention includes the steps of: receiving a snapshot creation request from a client computer; obtaining, upon reception of the snapshot creation request, a usage ratio of a second volume, which stores update differences of a first volume, by the update differences; identifying a user who has made the snapshot creation request from an account set in advance to the user; obtaining a use history of the update differences in the second volume of the user; choosing, based on the usage ratio and the use history, one from differential snapshot in which the update differences of the first volume are written in the second volume and volume snapshot in which a third volume is synchronized with the first volume; and executing the chosen one of differential snapshot and volume snapshot.

When the usage ratio is less than a preset first threshold, differential snapshot is chosen. When the usage ratio is equal to or more than a preset second threshold, volume snapshot is chosen. When the usage ratio is equal to or more than the preset first threshold and is less than the second threshold, differential snapshot or volume snapshot is chosen based on user's second volume use history.

According to the embodiment of this invention, the usage ratio of the second volume which stores differential snapshots is monitored to switch between differential snapshot and volume snapshot depending on the usage ratio as snapshot to be executed, and therefore it is possible to economically use the second volume which stores differential snapshots.

Switching snapshot to be executed depending on user's second volume use history also makes it possible to keep necessary differential snapshots while suppressing increase of unnecessary differential snapshots.

BRIEF DESCRIPTION OF THE DRAWINGS

FIG. 4 is an explanatory diagram showing a list of data read by a snapshot request reception processing module.

FIG. 6 is an explanatory diagram showing an example of a differential snapshot utilization log.

FIG. 9 is an explanatory diagram of a table tabulated by the differential snapshot utilization status obtaining module.

DETAILED DESCRIPTION OF THE PREFERRED EMBODIMENTS

A first embodiment of this invention will be described below with reference to the accompanying drawings.

Figure 1:
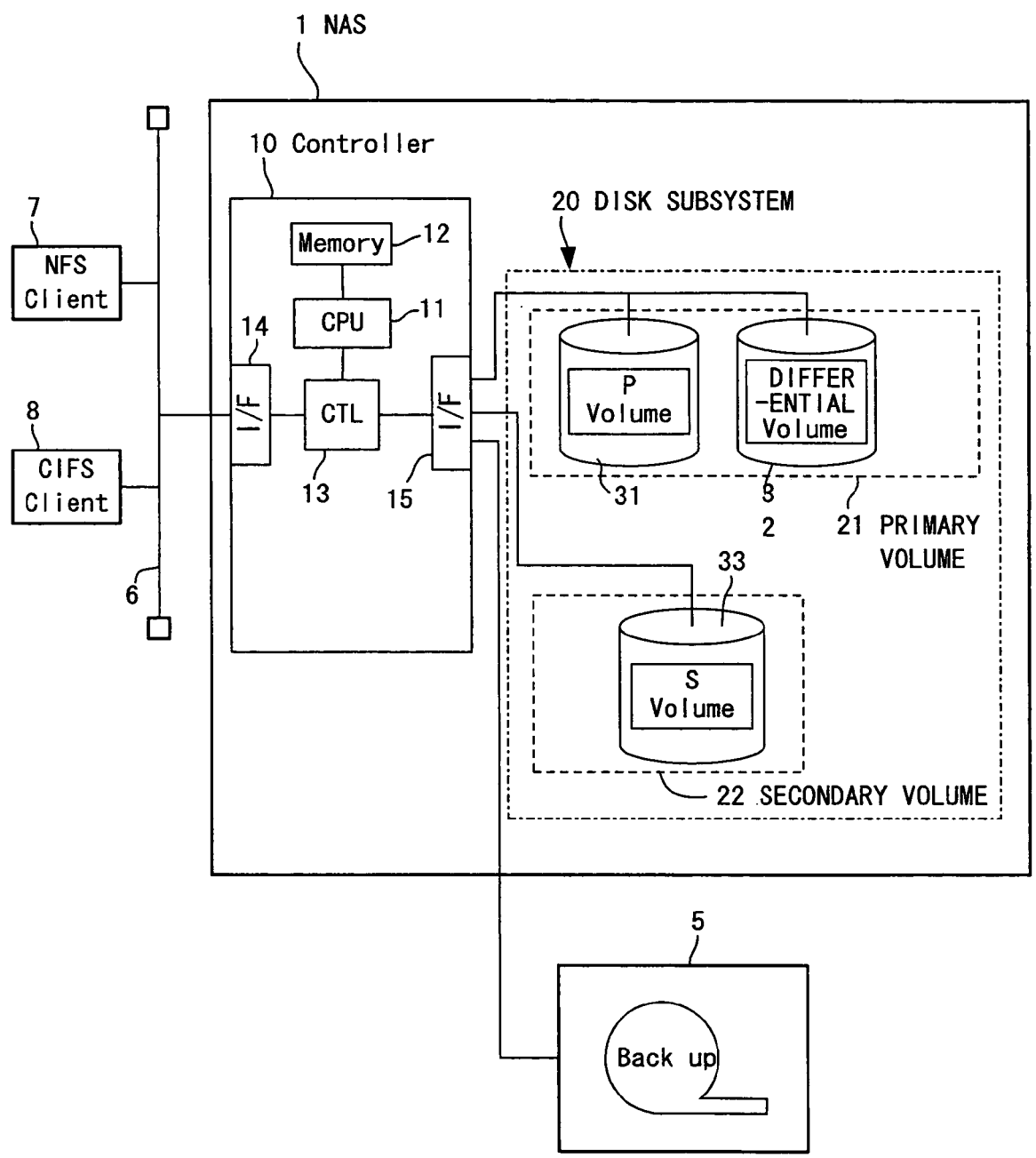
FIG. 1 is a block diagram showing the overall configuration of a system.
Figure 2:
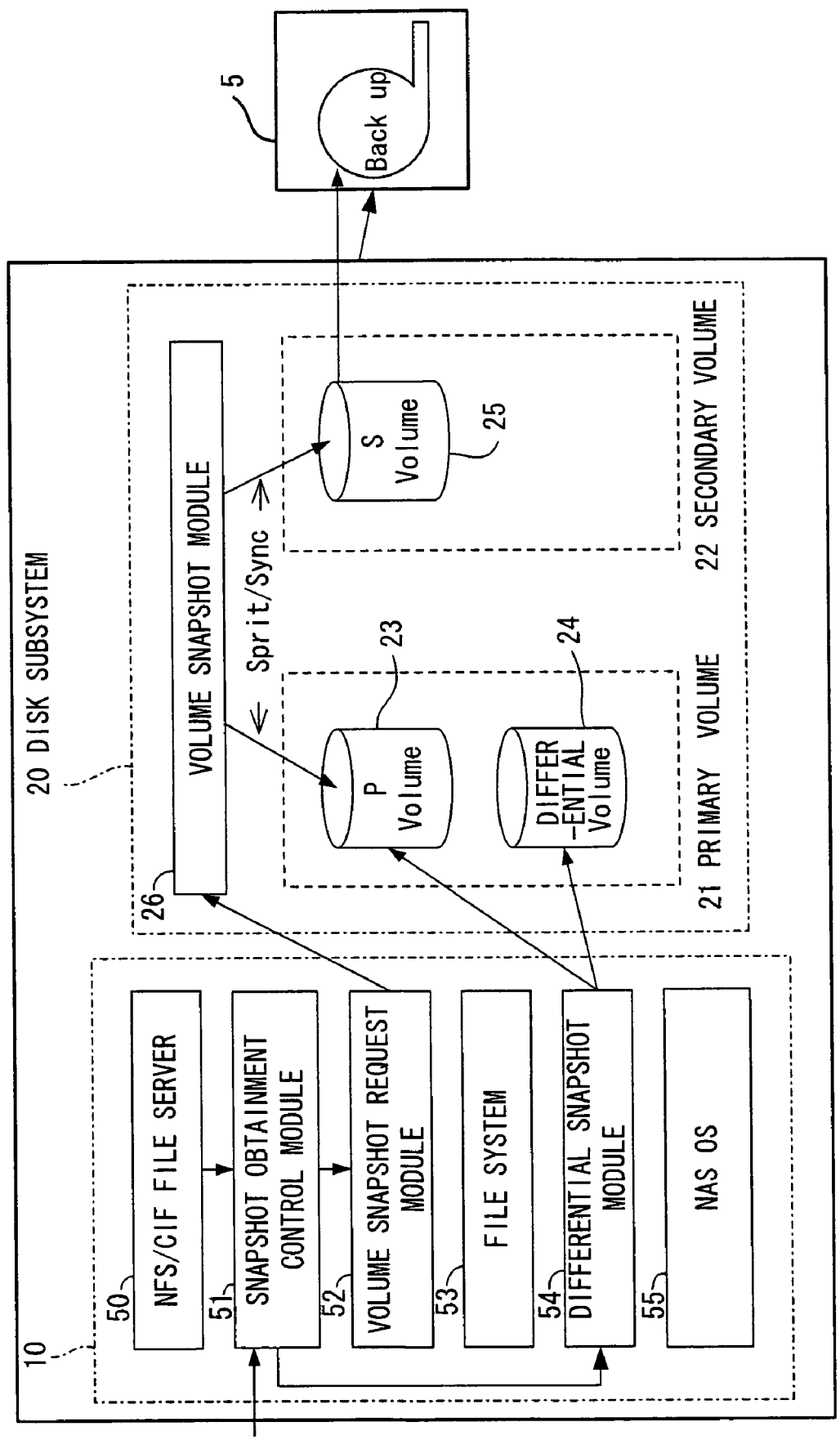
FIG. 2 is a block diagram showing the configuration of software executed by a controller of NAS.

FIG. 1 is a block diagram showing the overall configuration of a computer system for when this invention is applied to NAS (Network Attached Storage) 1, and FIG. 2 is a block diagram showing a software configuration of the NAS 1.

The NAS 1 is comprised of disk drives 31, 32 and 33, a disk subsystem 20, which is composed of the disk drives 31, 32 and 33, a backup system (tape system, for example) 5, and a controller 10, which controls the disk subsystem 20 and the backup system 5.

The NAS 1 is connected, via a network 6, to an NFS client computer 7 and a CIFS client computer 8, which request data write (update) and read (reference) from the NAS 1.

The NFS client computer 7 has as its OS UNIX and makes a request through the NFS (Network File System) to refer to and update data stored in the NAS 1. The CIFS client computer 8 has as its OS Windows and makes a request through the CIFS (Common Internet File System) to refer to and update data stored in the NAS 1.

The NFS client computer 7 and the CIFS client computer 8 can access the NAS 1 by administrator rights to set an access right to a user who accesses (for reference or update) data (file) stored in the NAS 1, to set an access right for each file or directory of the NAS 1, and to set the policy in switching snapshot described later. Preset file systems are built in the disk drives 31, 32 and 33.

In the disk subsystem 20, a primary volume 21 and a secondary volume 22, which stores a copy of the primary volume 21, are set in a storage area constituted of the disk drives 31, 32, and 33.

A P (Primary) volume 23, which is shown in FIG. 2 and which receives a file read request and a file update request from the NFS client computer 7 and from the CIFS client computer 8, and a differential volume 24, which stores differential snapshots of the P volume 23, are set in the primary volume 21.

In differential snapshot, data in the P volume 23 which is a primary volume is stored first prior to an update as update differential information in the differential volume 24. Then the data in the P volume 23 is updated for copy-on-write. With a differential snapshot function, which will be described later, a logical volume obtained by logically coupling the P volume 23 and the differential volume 24 is provided to one of the client computers (the NFS client computer 7 or the CIFS client computer 8, the same applies to the description below), thereby enabling the client computer to refer to the data before the update and the data after the update.

An S (Secondary) volume 25, which is shown in FIG. 2 and which stores a copy of the P volume 23 (volume copy), is set in the secondary volume 22.

Data of the secondary volume 22 (S volume 25) is backed up to the backup system 5 at a given timing (for instance, when an update is made to the data of the secondary volume 22).

The NFS client computer 7 and the CIFS client computer 8 each have a CPU, a memory, an interface connected to the network 6, a display device, and an input device though those components are not shown in the drawing.

The controller 10 of the NAS 1 uses control programs, which will be described later, to control data input/output to and from the disk subsystem 20 in accordance with a file read request and a file update request from one of the client computers, and creates a snapshot.

In FIG. 1, the controller 10 of the NAS 1 has a CPU 11, a memory 12, a data transfer controller 13, a network interface 14, and a storage interface 15. The memory 12 may have a data cache (omitted from the drawing) or the data transfer controller 13 may have a data cache.

Control programs shown in FIG. 2 are loaded onto the memory 12. The CPU 11 loads and executes the control programs to implement various processing, which will be described later.

The data transfer controller 13 transfers data between the CPU 11, the network interface 14, the storage interface 15, and the memory 12.

FIG. 2 shows function blocks of the control programs executed by the controller 10. A NAS_OS 55 manages execution of each control program. For instance, the NAS_OS 55 manages execution of an NFS/CIFS file server 50, which receives file access from one of the client computers, a snapshot obtainment control module 51, which selectively switches between the differential snapshot function and a volume snapshot (volume copy) function, a volume snapshot request module 52, which creates a copy of the P volume 23 in the S volume 25, a file system 53, which accesses the P volume 23 based on file access from the NFS/CIFS file server 50, and a differential snapshot module 54, which creates an update difference of the P volume 23 in the differential volume 24.

A volume snapshot module 26, which selectively copies the contents of the P volume 23 to the S volume 25, functions in the disk subsystem 20 of the NAS 1.

The volume snapshot module 26 is for putting the P volume 23 and the S volume 25 into a state in which the volumes are in sync with each other or a state in which the volumes are out of sync with each other. Upon receiving a volume snapshot creation request from the volume snapshot request module 52, the volume snapshot module 26 synchronizes the S volume 25 with the P volume 23 and writes a copy of the P volume 23 in the S volume 25 to create a volume snapshot. After the volume snapshot is completed, the volume snapshot module 26 sets the P volume 23 and the S volume 25 out of sync with each other, so that the contents of the S volume 25 are kept whereas the P volume 23 is updated.

Hardware or firmware of the NAS 1 serves as the volume snapshot module 26.

In response to an authentication request from the client computer 7 or 8, the NFS/CIFS file server 50 checks the authenticity of an account ID of a user to be authenticated and a preset user account ID based on passwords. When a read request or an update request is received from the authenticated user (account ID), the server 50 refers to or updates the P volume 23 which is a primary volume (file access reception processing). User information including user's account ID, password, and the like is stored in an arbitrary disk drive selected from the disk drives 31 and 32 (volumes excluding the primary volume (P volume 23) and volumes for keeping snapshots), and is set through the client computer 7 or 8 authenticated by administrator rights.

Figure 3:
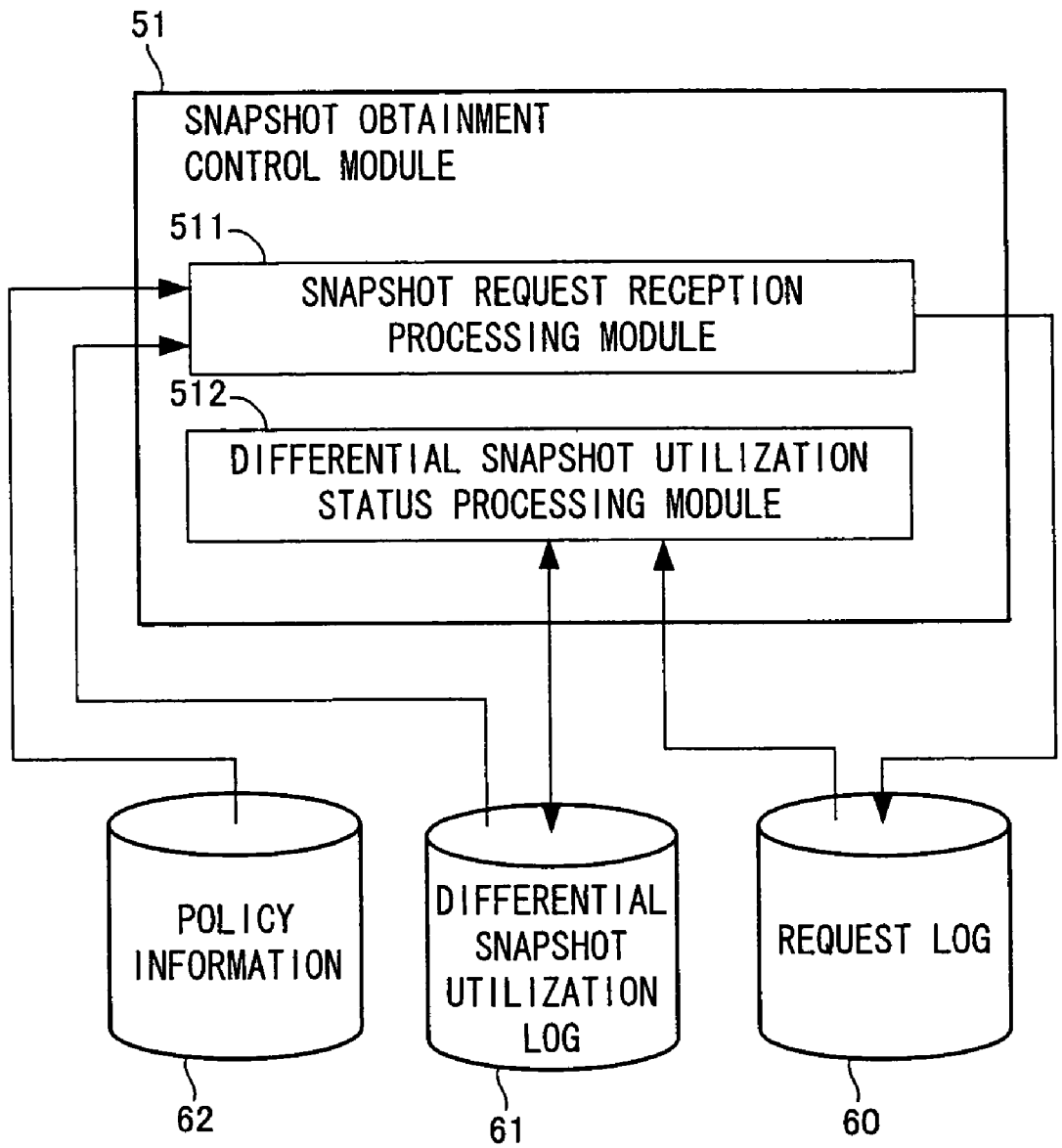
FIG. 3 is a block diagram showing a software configuration of a snapshot obtainment control module.

FIG. 3 shows details of the snapshot obtainment control module 51.

The snapshot obtainment control module 51 is composed of a snapshot request reception processing module 511, which receives a snapshot creating or deletion request from the client computer 7 or 8 or from others and which determines the type of snapshot to be employed, and a differential snapshot utilization status obtaining module 512, which obtains the utilization status of differential snapshots stored in the differential volume 24 to create a differential snapshot utilization log 61.

On receiving a snapshot creation request from the client computer 7 or 8, the snapshot request reception processing module 511 reads, as will be described later, a request log 60, which shows what snapshot request is made, and the differential snapshot utilization log 61, which shows the utilization status of differential snapshots, to determine which of differential snapshot and volume snapshot is to be employed. In the case where the determination is to employ differential snapshot, the snapshot request reception processing module 511 sends a differential snapshot creation request to the differential snapshot module 54 whereas a volume snapshot creation request is sent to the volume snapshot module 26 in the case where the determination is to employ volume snapshot. Then the S volume 25 is synchronized with the P volume 23, to execute creation of a snapshot.

Figure 5:
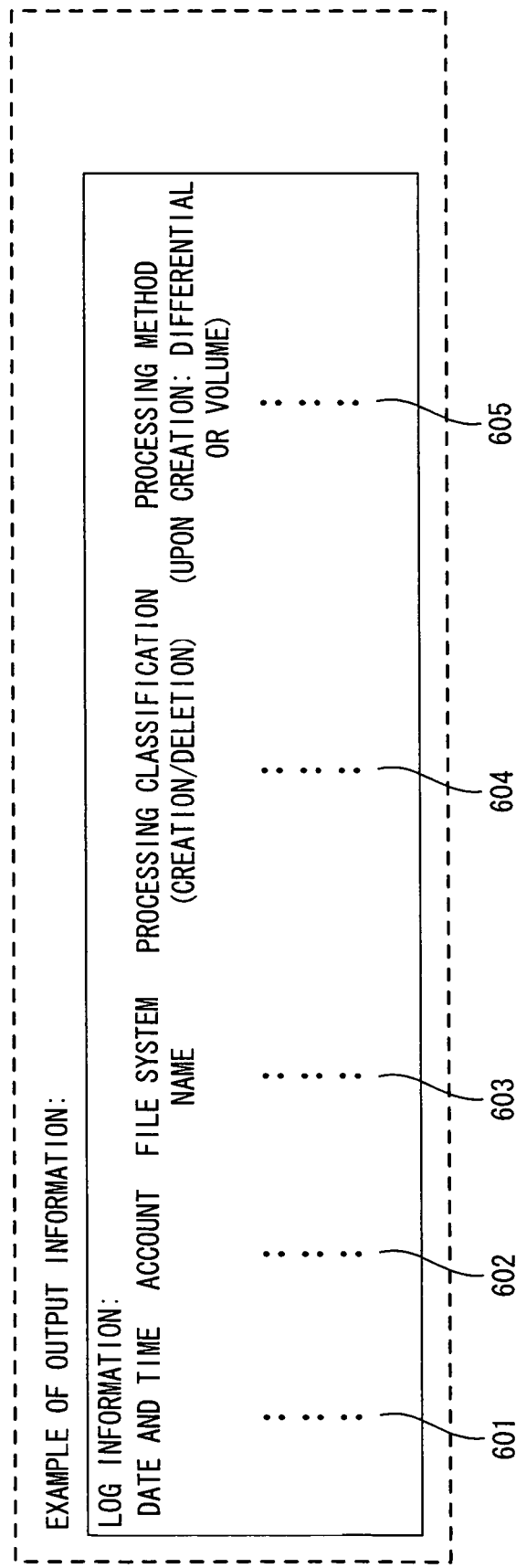
FIG. 5 is an explanatory diagram showing an example of a request log.

The request log 60 is created by the snapshot request reception processing module 511 upon reception of a snapshot creation request. An example of the request log 60 which is shown in FIG. 5 is composed of a date and time 601 indicative of when a snapshot creating or deletion request is made, an account ID 602 of the user who has made the request, a file system name 603 to which the snapshot creating or deletion request is addressed, a processing classification 604 indicating whether the request made is a creation request or deletion request, and a processing method 605 indicating whether the determined snapshot processing is differential snapshot or volume snapshot, all of which are registered as one record.

As shown in FIG. 6, the differential snapshot utilization log 61 has a record entered for each file system name 611. The log 61 holds differential snapshot utilization status (use history) 612 for each of user account IDs, which correspond to the respective file system names. For instance, "7/10" is registered in FIG. 6 as the utilization status 612 for the account ID "account1" which corresponds to the file system name 611 of fs1. The entry indicates that seven differential snapshots created by this user are left in the differential volume 24 and that there have been ten snapshot creation requests.

The number of differential snapshots remaining in the differential volume 24 (remaining SS number) and the number of times a snapshot request is made (SS request count) are similarly recorded for users of accounts 2 and 3. Alternatively, recorded in the log 61 may be the ratio of the number of remaining snapshots (remaining SS number) to the number of times a snapshot request is made (SS request count) (remaining SS number/SS request count).

The differential snapshot utilization log 61 has the differential snapshot utilization status recorded for the user account ID 612 of each of plural users in association with each file system name 611, and has as many fields for holding user account IDs as the number of users (612n in FIG. 6). The differential snapshot utilization log 61 is updated periodically (every few hours or every other day) by the differential snapshot utilization status obtaining module 512 through batch processing or the like.

Described next is the policy employed by the snapshot request reception processing module 511 in determining which of a differential snapshot and a volume snapshot is to be created.

The snapshot request reception processing module 511 reads preset policy information 62 to determine the type of snapshot to be created in a manner described below. An example of the policy information 62 is comprised of a judgment condition 1 and a judgment condition 2 as shown in FIG. 4.

Judgment Condition 1:

a) Employ differential snapshot when the usage ratio of the differential volume 24 is less than 30%.

b) Determine based on the differential condition 2 when the usage ratio of the differential volume 24 is equal to or more than 30% and less than 70%.

c) Employ volume snapshot when the usage ratio of the differential volume 24 is equal to or more than 70%.

Judgment Condition 2:

d) Employ differential snapshot when the ratio of the remaining SS number to the SS request count of a user who has made the request is less than 30%.

e) Employ volume snapshot when the ratio of the remaining SS number to the SS request count of a user who has made the request is equal to or more than 30%.

With the above policy, which is based on the usage ratio of the differential volume 24 and on the ratio of the remaining SS number and the SS request count of a user who has made the request, which of differential snapshot and volume snapshot is to be employed is determined in response to the snapshot creation request from the user. The usage ratio of the differential volume 24 is obtained by a function included in the file system 53.

The policy information 62, the request log 60, and the differential snapshot utilization log 61 are stored in an arbitrary disk drive selected from the disk drives 31 and 32.

Figure 7:
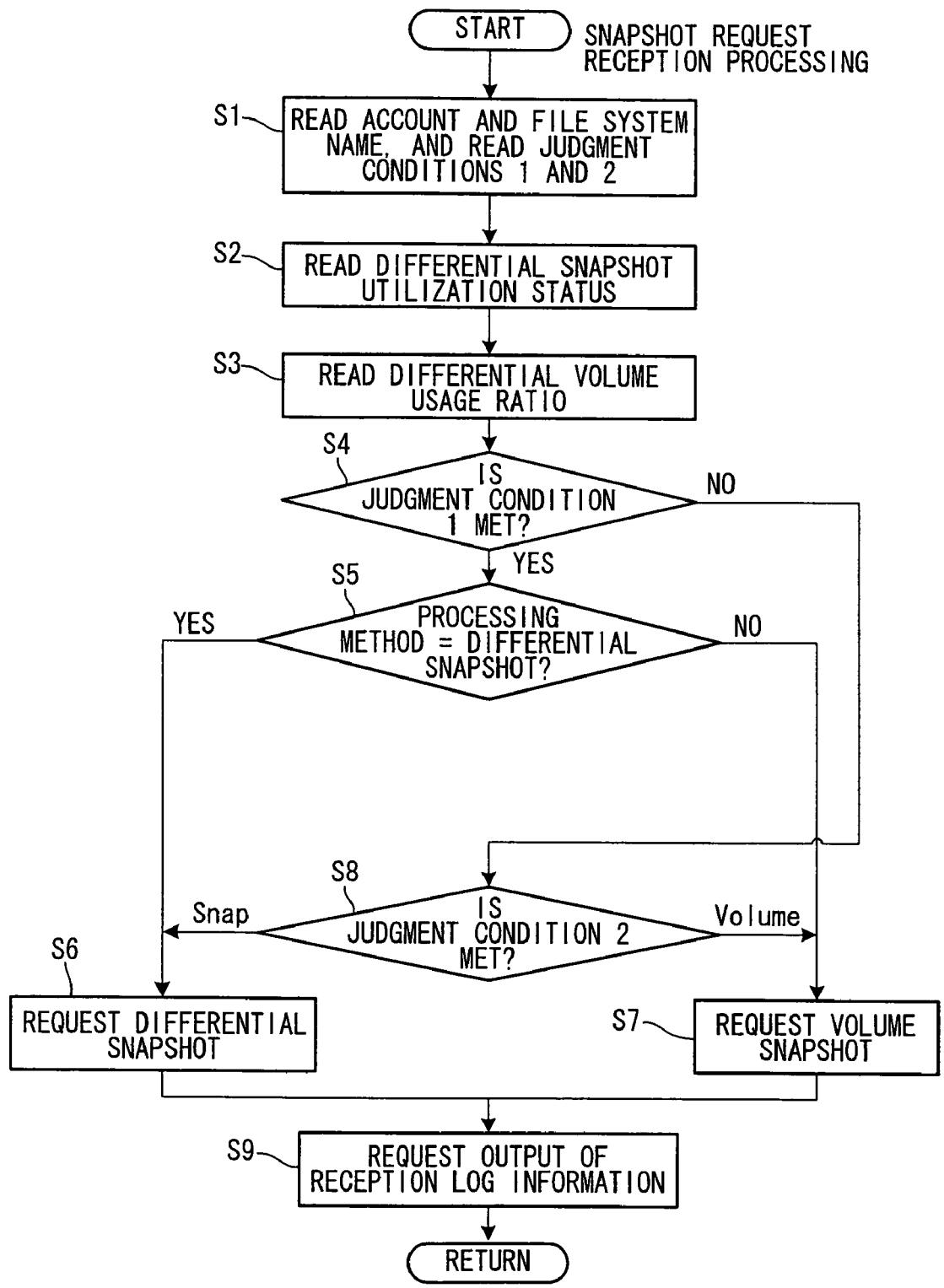
FIG. 7 is a flow chart showing an example of processing performed by the snapshot request reception processing module.

Referring to a flow chart of FIG. 7, snapshot creation request processing implemented by the snapshot request reception processing module 511 will be described next. The flow chart is of processing executed upon reception of a snapshot creation request from the client computer 7 or 8.

In a step S1, the account ID and file system name of a user who has made a snapshot creation request are read and the judgment conditions 1 and 2 are read from the policy information 62.

In a step S2, the account ID and file system name read in the step S1 are used as keys to search the differential snapshot utilization log 61 for the differential snapshot utilization status (remaining number/request count) of the account ID and file system name in question. Then the ratio of the number of remaining differential snapshots to the number of times a differential snapshot creation request is made is obtained for the file system name of this user.

In a step S3, the ratio of how much of the total capacity of the differential volume 24 is used up by current differential snapshots is obtained.

In a step S4, the obtained usage ratio is compared against the judgment condition 1 of the policy information 62 which has been read in the step S1 and, when a) or c) of the judgment condition 1 is met, the processing proceeds to a step S5. When neither a) nor c) is met, the processing proceeds to a step S8 where the obtained usage ratio is compared against the judgment condition 2.

In the step S5, which of a) and c) of the judgment condition 1 is met is judged and, when a) of the judgment condition 1 is met, the processing proceeds to a step S6 where the differential snapshot module 54 is instructed to write update differences of the P volume 23 in the differential volume 24. When c) of the judgment condition 1 is met, the processing proceeds to a step S7 where the volume snapshot module 26 is instructed to synchronize the S volume 25 with the P volume 23.

In the step S8, which of d) and e) of the judgment condition 2 is met is judged and, when d) is met, the processing proceeds to the step S6 where the differential snapshot module 54 is instructed to write update differences of the P volume 23 in the differential volume 24. When e) of the judgment condition 2 is met, the processing proceeds to the step S7 where the volume snapshot module 26 is instructed to write the contents of the P volume 23 in the S volume 25 and to write update differences of the P volume 23 in the differential volume 24.

After creation of a snapshot is instructed in the step S6 or S7, the processing proceeds a step S9 where the current date and time, the account ID, the file system name, the processing classification, and the processing method determined through this processing are written in the request log 60 as shown in FIG. 5.

Through the snapshot creation request reception processing described above, creation of a differential snapshot is permitted in the case where the usage ratio of the differential volume 24 at a time point when a user makes a snapshot creation request is less than a preset first threshold (30% in this example) whereas creation of a differential snapshot is prohibited and a volume snapshot is created instead in the case where the usage ratio of the differential volume 24 is less than a present second threshold (70% in this example).

Therefore, when the usage ratio of the differential volume 24 is high (when the usage ratio is equal to or more than the second threshold), a volume snapshot is created in response to every snapshot creation request from users and the differential volume 24 is prevented from overflowing with differential snapshots.

When the usage ratio of the differential volume 24 is low (when the usage ratio is less than the first threshold), a differential snapshot is created in response to every snapshot creation request from users and new data can be written in the P volume 23 for update while keeping past data.

When the usage ratio of the differential volume 24 is equal to or more than the first threshold and is less than the second threshold, the judging condition 2 is used to determine whether differential snapshot or volume snapshot is to be employed based on the use history which is recorded by file system names of users in the differential snapshot utilization log 61.

To elaborate, the differential snapshot utilization log 61 is searched with the use of the account ID and file system name of a user who has made the request and, when the ratio of the number of remaining differential snapshots to the number of times a snapshot creation request is made is less than a preset third threshold, the use of differential snapshot is permitted. On the other hand, when the ratio of the number of remaining differential snapshots to the number of times a snapshot creation request is made is equal to or more than the preset third threshold, the use of differential snapshot is prohibited and volume snapshot is employed instead.

Accordingly, when the usage ratio of the differential volume is at an intermediate level (when the usage ratio is equal to or more than the first threshold and is less than the second threshold), a user whose ratio of the remaining differential snapshot number (remaining SS number/SS request count) is low (less than the third threshold) is allowed to create a differential snapshot whereas a user whose ratio of the remaining differential snapshot number (remaining SS number/SS request count) is high (equal to or more than the third threshold) is allowed to create volume snapshot but not a differential snapshot.

In other words, a user who is diligent in maintenance by frequently deleting differential snapshots as occasion demands is always allowed to create a differential snapshot as long as the usage ratio of the differential volume 24 is less than the second threshold whereas a user who infrequently deletes differential snapshots that the user has created is restricted in newly creating differential snapshots.

In the case where the usage ratio of the differential volume 24 is less than the second threshold, permission to use differential snapshot is given in accordance with the past differential snapshot maintenance performance of a user who makes a snapshot creation request through the client computer 7 or 8. This makes it possible to allow a user who is not diligent in the maintenance of differential snapshots to use volume snapshot but not differential snapshot. The usage ratio of the differential volume 24 is thus prevented from rising excessively and economical use of a differential volume is achieved.

The snapshot request reception processing module 511 performs the following processing (not shown in the drawing) in response to a snapshot deletion request.

A differential snapshot in the differential volume 24 which is associated with the account ID and file system name of a user who has made the deletion request is deleted. The processing is completed by writing the date and time the request is made, the account ID and the file system name, and "deletion" and "differential" in the request log 60 shown in FIG. 5.

Figure 8:
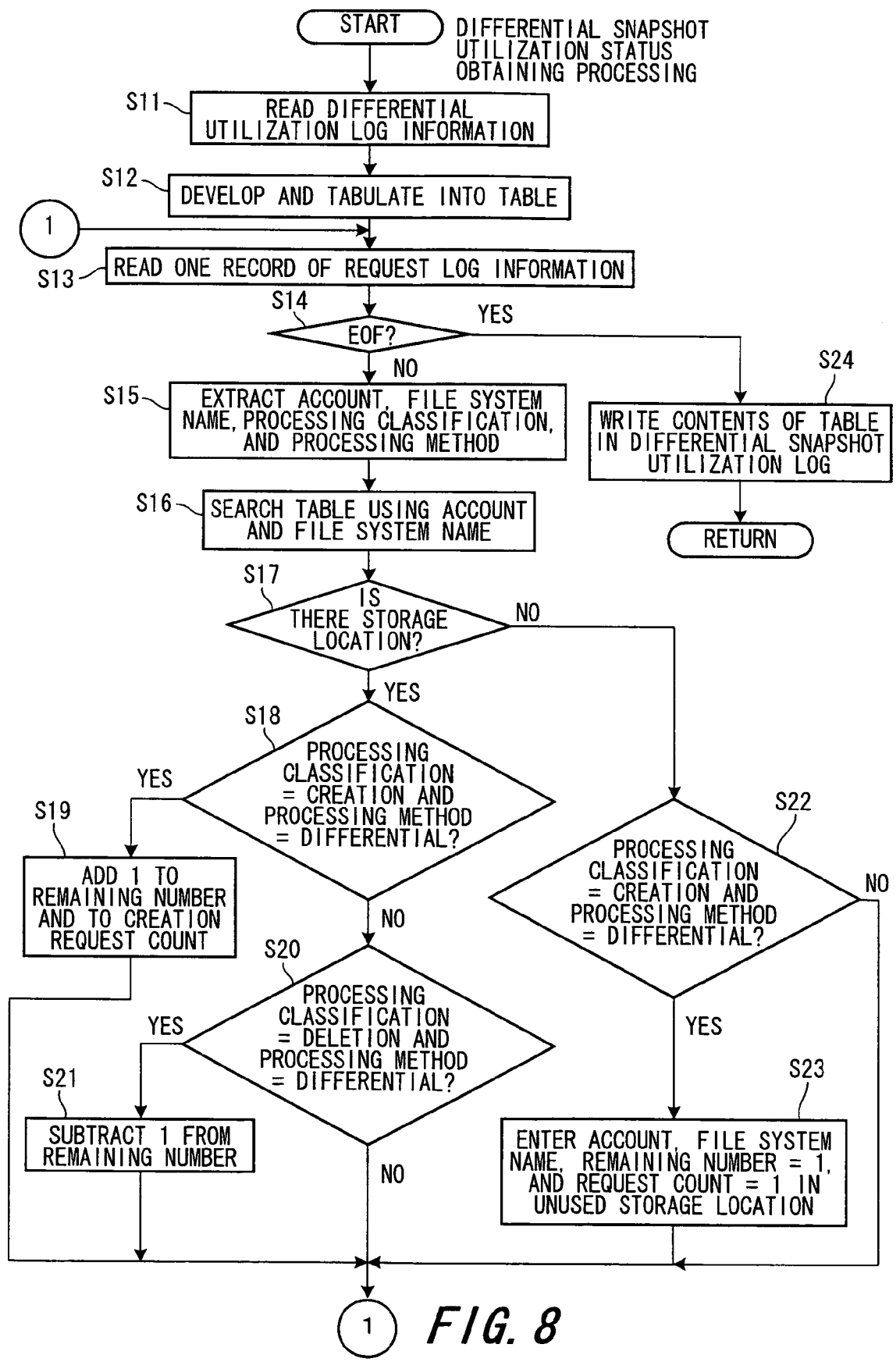
FIG. 8 is a flow chart showing an example of differential snapshot utilization status obtaining processing carried out by a differential snapshot utilization status obtaining module.

The description given next with reference to a flow chart of FIG. 8 is about how the differential snapshot utilization log 61 used in the step S2 is created. The flow chart in FIG. 8 is of processing executed by the differential snapshot utilization status obtaining module 512 at the given timing described above through batch processing or the like.

In a step S11, the differential snapshot utilization log 61 shown in FIG. 6 is read first. In a step S12, the differential snapshot utilization log 61 read is developed and tabulated to obtain the table shown in FIG. 9. The table is developed in the memory 12, and provides in the row direction an account ID 711, a file system name 712, the number of remaining differential snapshots, and the number of times a snapshot creation request is made, whereas numbers associated with account IDs and file system names are given in the column direction. For instance, for an account ID of user001 whose index i is n−1 has fs1 set as the file system name 712. The table stores the remaining differential snapshot number, 5, and the snapshot creation request count, 10, for the file system fs1 of the user whose account ID is user001.

In a step S13, entries in the request log 60 are read one record at a time starting from the head to carry out the following processing:

In a step S14, whether the end (End Of File) of the request log 60 has been reached or not is judged and, when the end has not been reached, the processing proceeds to a step S15 whereas the processing proceeds to a step S24 when the end has already been reached.

In the step S15, the account ID, the file system name, the processing classification, and the processing method are extracted from the request log 60 read.

In a step S16, the table shown in FIG. 9 is searched with the account ID and the file system name as keys.

In a step S17, whether or not the corresponding account ID and file system name are found as a result of the search is checked. When the corresponding data is found, the processing proceeds to a step S18 whereas the processing proceeds to a step S22 when the corresponding data is not found.

In the step S18, whether or not the processing classification is "creation" and whether or not the processing method is "differential" are judged. When both of the conditions are met, the processing proceeds to a step S19 where the table is updated by adding 1 is to each of the remaining SS number and the creation request count in the table.

When the conditions are not met in the step S18, the processing proceeds to a step S20 in which whether or not the processing classification is "deletion" and whether or not the processing method is "differential" are judged. When both of the conditions are met, the processing proceeds to a step S21 to update the table by subtracting 1 from the remaining SS number in the table. When the conditions are not met in the step S20, the processing returns to the step S13.

When it is judged in the step S17 that there is no corresponding data, the processing proceeds to a step S22 to judge whether or not the processing classification is "creation" and whether or not the processing method is "differential". When both of the conditions are met, the processing proceeds to a step S23 in which the table is updated by storing, in an unused storage area of the table, the account ID, the file system, 1 as the remaining SS number, and 1 as the creation request count. When the conditions are not met, the processing returns to the step S13.

The steps S13 through S19, S21, and S23 are repeatedly executed until the end of the request log 60 is reached. Then the processing proceeds to the step S24 where the updated table is written in the differential snapshot utilization log 61.

In this way, the differential snapshot utilization status obtaining module 512 reads the request log 60 periodically to manage creation or deletion of differential snapshots on the basis of a combination of user account ID and file system name and to sum up increase and decrease in differential snapshot number and differential snapshot request count.

The snapshot request reception processing module 511 consults the differential snapshot utilization log 61 updated in FIG. 8 to obtain accurate understanding of the differential snapshot maintenance status for each user and file system.

In the above embodiment, the differential snapshot maintenance status of each user and file system is obtained from the number of snapshots remaining in the differential volume 24 and the snapshot creation request count. Alternatively, a queue holding services that are not deleted may be provided for each user and file system, with a snapshot creation request taken as reception of a service and deletion of a snapshot as completion of a snapshot, so that permission to use differential snapshot is given in accordance with the size of the queue. In this case, the remaining number in the flow chart of FIG. 8 is replaced with the queue and one service is added to the queue in the steps S19 and S23 whereas one service is deleted from the queue in the step S20.

When the ratio of the volume used up by differential snapshots is equal to or more than the first threshold and is less than the third threshold, differential snapshot is employed in the case where the number of queues is smaller than a preset fourth threshold whereas volume snapshot is employed in the case where the number of queues is equal to or larger than the fourth threshold.

Figure 10:
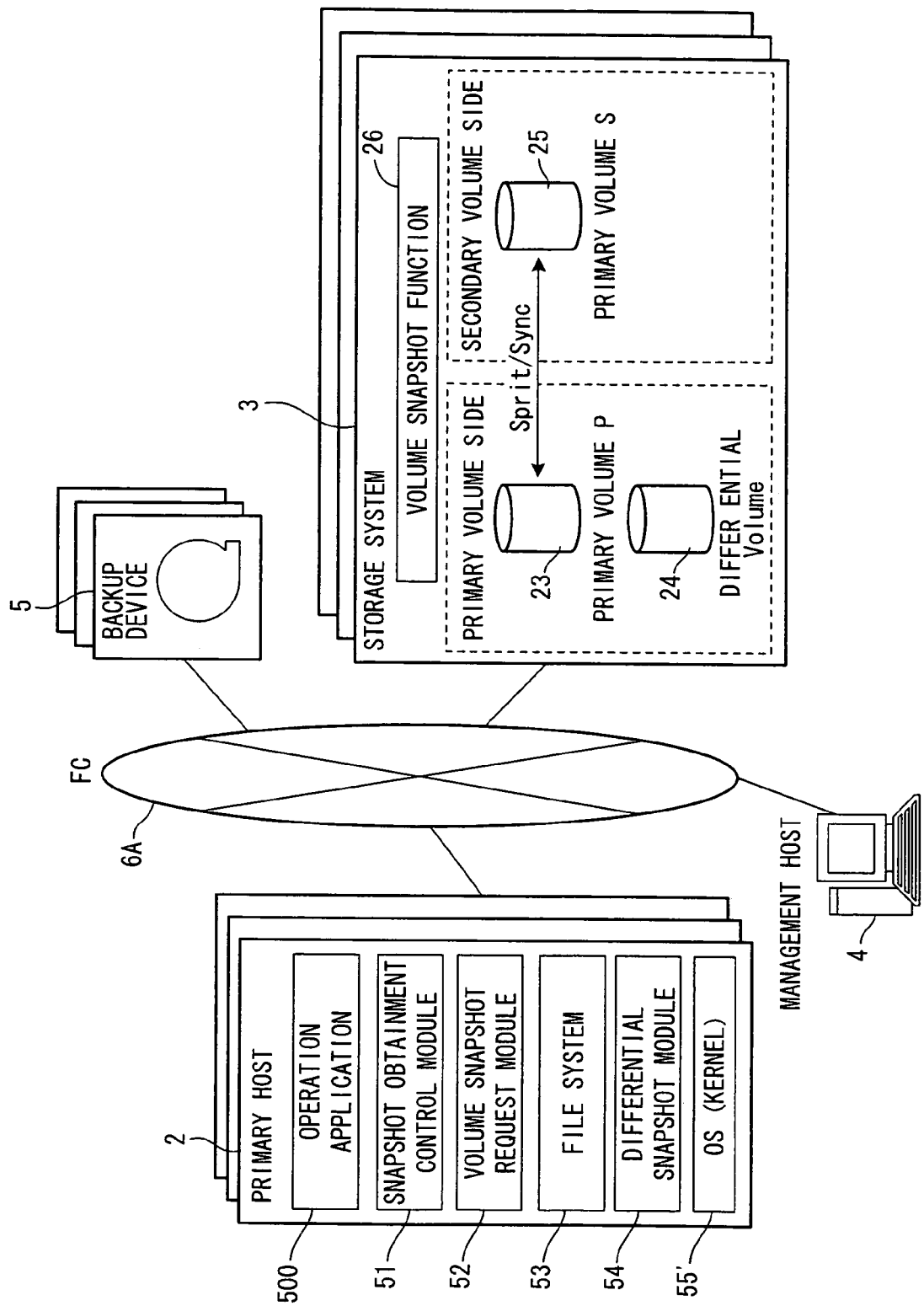
FIG. 10 is a block diagram showing the overall configuration of a system that uses a SAN according to a second embodiment of this invention.

FIG. 10 shows a second embodiment of this invention as applied to a SAN (Storage Area Network) instead of the NAS 1 of the first embodiment.

Connected to a SAN 6a composed of an FC (Fiber Channel) and others are a storage system 3, which has plural disk drives, a primary host computer 2, which requests data reference or update from the storage system 3 and which creates or deletes a snapshot, and a backup system 5, which backs up data of the storage system 3. A management host computer 4 is also connected to the SAN 6a to set storage areas such as a, P volume 23, a differential volume 24, and an S volume 25 in the storage system 3 and to allot the storage areas to the primary host computer 2.

An application 500, a snapshot obtainment control module 51, a volume snapshot request module 52, a file system 53, and a differential snapshot module 54 are executed on an OS 55' of the primary host computer 2. The application 500 refers to and updates the P volume 23 of the storage system 3. The snapshot obtainment control module 51 selectively switches between differential snapshot and volume snapshot (volume copying). The volume snapshot request module 52 issues an instruction to create a copy of the P volume 23 in the S volume 25. The file system 53 accesses the P volume 23 based on file access from the application 500. The differential snapshot module 54 creates update differences of the P volume 23 in the differential volume 24.

A volume snapshot module 26 which selectively copies the contents of the P volume 23 to the S volume 25 functions in the storage system 3.

The snapshot obtainment control module 51, the snapshot request module 52, the file system 53, the differential snapshot module 54, and the volume snapshot module 26 are structured in a manner similar to those in the first embodiment. The differential snapshot maintenance status for each user and file system is obtained from a request log 60 and a differential snapshot utilization log 61, which are stored in the storage system 3 or the like. The obtained status is used to judge whether differential snapshot can be employed or not. A switch is made between differential snapshot and volume snapshot depending on the result of the judgment to create a snapshot.

The backup system 5 backs up, at a given timing, the contents of the S volume 25 which stores volume snapshots.

As in the first embodiment, the invention applied to the SAN is capable of keeping copies of data using volume snapshot while preventing the differential volume 24 from overflowing with snapshots by selectively permitting the use of differential snapshot in accordance with the differential snapshot maintenance status obtained for each user and file system when the usage ratio of the differential snapshot volume 24 is less than the second threshold.

While the present invention has been described in detail and pictorially in the accompanying drawings, the present invention is not limited to such detail but covers various obvious modifications and equivalent arrangements, which fall within the purview of the appended claims.

What is claimed is:

1. A snapshot creating method for a storage system comprising a first volume storing data to be read or updated, a second volume storing update differences of the first volume, and a third volume storing a copy of the first volume, in which a snapshot of the first volume is created in response to a request from a client computer, the method comprising:
   receiving a snapshot creation request from the client computer;
   obtaining a usage ratio of the second volume by update differences at a time when the snapshot creation request is made;
   identifying a user who has made the snapshot creation request from a preset account;
   obtaining an update difference use history indicating use history of update differences in the second volume of the user;
   choosing, based on the usage ratio and the use history, one from different snapshot in which update differences of the first volume are written in the second volume and volume snapshot in which the third volume is synchronized with the first volume; and
   executing the chosen one of differential snapshot and volume snapshot.

2. The snapshot creating method according to claim 1, wherein the choosing of one from differential snapshot and volume snapshot includes choosing differential snapshot irrespective of what the use history indicates when the usage ratio of the second volume by update differences is less than a preset first threshold, and choosing volume snapshot irrespective of what the use history indicates when the usage ratio of the second volume by update differences is equal to or more than a preset second threshold.

3. The snapshot creating method according to claim 1, wherein the choosing of one from differential snapshot and volume snapshot includes choosing one from the differential snapshot and the volume snapshot based on the update difference use history of the user when the usage ratio of the second volume by update differences is equal to or more than the preset first threshold and is less than the second threshold.

4. The snapshot creating method according to claim 3,
wherein the obtaining of the update difference use history of the user comprises obtaining a remaining update difference number indicating a ratio of the number of update differences that are created by the user and remain in the second volume to a creation request count indicating the number of times the user has made a snapshot creation request, and
wherein the choosing of one from differential snapshot and volume snapshot includes, when the usage ratio of the second volume by update differences is equal to or more than the preset first threshold and is less than the second threshold, choosing differential snapshot in a case where the ratio of the remaining update difference number to the creation request count is less than a preset third threshold, and choosing volume snapshot in a case where the ratio of the remaining update difference number to the creation request count is equal to or more than the third threshold.

5. The snapshot creating method according to claim 4, wherein the obtaining of the ratio of the number of update differences that are created by the user and remain in the second volume to the number of times the user has made a snapshot creation request comprises obtaining a ratio of the number of update differences created by the user for each file system to the number of times the user has made a snapshot creation request for each file system.

6. The snapshot creating method according to claim 3,
wherein the obtaining of the update difference use history of the user comprises obtaining the number of update differences used in the second volume as the number of queues based on a creation request number indicating the number of snapshot creation requests made by the user, a deletion request number indicating the number of update differences deleted upon request from the user, and a difference between the creation request number and the deletion request number, and
wherein the choosing of one from differential snapshot and volume snapshot includes, when the usage ratio of the second volume by update differences is equal to or more than the preset first threshold and is less than the second threshold, choosing differential snapshot in a case where the number of queues is smaller than a preset fourth threshold, and choosing volume snapshot in a case where the number of queues is equal to or larger than the fourth threshold.

7. The snapshot creating method according to claim 6, wherein the obtaining of the number of update differences used in the second volume as the number of queues comprises obtaining the number of update differences used in the second volume as the number of queues based on the number of snapshot creation requests made by the user for each file system, the number of update differences deleted upon request from the user for each file system, and a difference between the creation request number and the deletion request number.

8. A program used in a storage system comprising a first volume storing data to be read or updated, a second volume storing update differences of the first volume, and a third volume storing a copy of the first volume, for creating a snapshot of the first volume in response to a request from a client computer, the program controlling a computer to execute the processing of:

receiving a snapshot creation request from the client computer;

obtaining a usage ratio of the second volume by update differences at a time when the snapshot creation request is made;

identifying a user who has made the snapshot creation request from an account;

obtaining an update difference use history indicating use history of update differences in the second volume of the user;

choosing, based on the usage ratio and the use history, one from different snapshot in which update differences of the first volume are written in the second volume and volume snapshot in which the third volume is synchronized with the first volume; and executing the chosen one of differential snapshot and volume snapshot.

9. The program according to claim 8, wherein the processing of choosing one from differential snapshot and volume snapshot includes choosing differential snapshot irrespective of what the use history indicates when the usage ratio of the second volume by update differences is less than a preset first threshold, and choosing volume snapshot irrespective of what the use history indicates when the usage ratio of the second volume by update differences is equal to or more than a preset second threshold.

10. The program according to claim 8, wherein the processing of choosing one from differential snapshot and volume snapshot includes choosing one from the differential snapshot and the volume snapshot based on the update difference use history of the user when the usage ratio of the second volume by update differences is equal to or more than the preset first threshold and is less than the second threshold.

11. The program according to claim 10,
wherein the processing of obtaining the update difference use history of the user comprises obtaining a remaining update difference number indicating a ratio of the number of update differences that are created by the user and remain in the second volume to the number of times the user has made a snapshot creation request, and
wherein the processing of choosing one from differential snapshot and volume snapshot includes, when the usage ratio of the second volume by update differences is equal to or more than the preset first threshold and is less than the second threshold, choosing differential snapshot in a case where the ratio of the remaining update difference number to the creation request count is less than a preset third threshold, and choosing volume snapshot in a case where the ratio of the remaining update difference number to the creation request count is equal to or more than the third threshold.

12. The program according to claim 11, wherein the processing of obtaining the ratio of the number of update differences that are created by the user and remain in the second volume to the number of times the user has made a snapshot creation request comprises obtaining a ratio of the number of update differences created by the user for each file system to the number of times the user has made a snapshot creation request for each file system.

13. The program according to claim 10,
wherein the processing of obtaining the update difference use history of the user comprises obtaining the number of update differences used in the second volume as the number of queues based on a creation request number indicating the number of snapshot creation requests made by the user, a deletion request number indicating the number of update differences deleted upon request from the user, and a difference between the creation request number and the deletion request number, and
wherein the processing of choosing one from differential snapshot and volume snapshot includes, when the usage ratio of the second volume by update differences is equal to or more than the preset first threshold and is less than the second threshold, choosing differential snapshot in a case where the number of queues is smaller than a preset fourth threshold, and choosing volume snapshot in a case where the number of queues is equal to or larger than the fourth threshold.

14. A storage system comprising:
a disk subsystem comprising plural volumes; and
a control unit which controls the disk subsystem in response to a request from a client computer,
wherein the disk subsystem comprises a first volume, which stores data to be referred to or updated, a second volume, which stores update differences of the first volume, and a third volume, which stores a copy of the first volume, and
wherein the storage system further comprises:
an access control module which accesses the first volume in response to a reference request or update request from the client computer;
a snapshot request receiving module which receives a snapshot creation request from the client computer connected via a network;
a differential snapshot executing module which executes differential snapshot to write update differences of the first volume in the second volume;
a volume snapshot executing module which executes volume snapshot to synchronize the third volume with the first volume;
a usage ratio obtaining module which obtains a usage ratio of the second volume by update differences at a time when the snapshot creation request is received;
a use history obtaining module which obtains use history of update differences in the second volume of the user who has made the snapshot creation request; and
a snapshot executing module which chooses, upon reception of the snapshot creation request, one from the differential snapshot executing module and the volume snapshot executing module based on the usage ratio provided by the usage ratio obtaining module and the use history provided by the use history obtaining module, and which instructs the chosen executing module to create a snapshot.

15. The storage system according to claim 14, wherein the snapshot executing module includes choosing differential snapshot irrespective of what the use history indicates when the usage ratio of the second volume by update differences is less than a preset first threshold, and choosing volume snapshot irrespective of what the use history indicates when the usage ratio of the second volume by update differences is equal to or more than a preset second threshold.

16. The storage system according to claim 14, wherein the snapshot executing module includes choosing one from the differential snapshot and the volume snapshot based on the update difference use history of the user when the usage ratio of the second volume by update differences is equal to or more than the preset first threshold and is less than the second threshold.

17. The storage system according to claim 16,
wherein the usage ratio obtaining module comprises obtaining the number of update differences used in the second volume as the number of queues based on a creation request number indicating the number of snapshot creation requests made by the user, a deletion request number indicating the number of update differences deleted upon request from the user, and a difference between the creation request number and the deletion request number, and
wherein the volume snapshot executing module includes, when the usage ratio of the second volume by update differences is equal to or more than the preset first threshold and is less than the second threshold, choosing differential snapshot in a case where the number of queues is smaller than a preset fourth threshold, and choosing volume snapshot in a case where the number of queues is equal to or larger than the fourth threshold.

18. The storage system according to claim 16,
wherein the usage ratio obtaining module comprises obtaining a remaining update difference number indicating a ratio of the number of update differences that are created by the user and remain in the second volume to a creation request count indicating the number of times the user has made a snapshot creation request, and
wherein the volume snapshot executing module includes, when the usage ratio of the second volume by update differences is equal to or more than the preset first threshold and is less than the second threshold, choosing differential snapshot in a case where the ratio of the remaining update difference number to the creation request count is less than a preset third threshold, and choosing volume snapshot in a case where the ratio of the remaining update difference number to the creation request count is equal to or more than the third threshold.

19. The storage system according to claim 18, wherein the obtaining of the ratio of the number of update differences that are created by the user and remain in the second volume to the number of times the user has made a snapshot creation request comprises obtaining a ratio of the number of update differences created by the user for each file system to the number of times the user has made a snapshot creation request for each file system.

20. The storage system according to claim 18, wherein the obtaining of the number of update differences used in the second volume as the number of queues comprises obtaining the number of update differences used in the second volume as the number of queues based on the number of snapshot creation requests made by the user for each file system, the number of update differences deleted upon request from the user for each file system, and a difference between the creation request number and the deletion request number.

* * * * *